United States Patent

[11] 3,583,661

| [72] | Inventor | Nils Karl-Erik Stake<br>Linkoping, Sweden |
|---|---|---|
| [22] | Filed | June 23, 1969 |
| [45] | Patented | June 8, 1971 |
| [73] | Assignee | Saab Aktiebolag<br>Linkoping, Sweden |
| [32] | Priority | June 24, 1968 |
| [33] | | Sweden |
| [31] | | 8,490/68 |

[54] AIR INTAKE FOR TURBOJET AIRCRAFT ENGINE
4 Claims, 12 Drawing Figs.

[52] U.S. Cl. .................................................. 244/53B,
137/15.1
[51] Int. Cl. .............................................. B64d 33/02
[50] Field of Search ........................................ 244/53.8;
137/15.1

[56] References Cited
UNITED STATES PATENTS

| 2,699,906 | 1/1955 | Lee et al | 244/53 |
| 2,788,184 | 4/1957 | Michael | 244/53 |
| 2,981,502 | 4/1961 | Richter et al. | 244/53 |
| 3,222,863 | 12/1965 | Klees et al. | 244/53(X) |

*Primary Examiner*—Milton Buchler
*Assistant Examiner*—Jeffrey L. Forman
*Attorney*—Ira Milton Jones ABSTRACT: In an air intake duct for a jet engine of an aircraft that may at times fly in a direction oblique to its longitudinal axis, the duct has a slot through its wall, near its front and at its side against which the relative wind directly strikes during such flight, to counteract secondary transverse flow in the interior duct boundary layer, thus assuring that air at the engine compressor inlet has circumferentially uniform pressure and velocity distribution.

PATENTED JUN 8 1971

INVENTOR
Nils Karl-Erik Ståke
BY Ira Milton Jones
ATTORNEY

INVENTOR
Nils Karl-Erik Stäke
BY
ATTORNEY

PATENTED JUN 8 1971

INVENTOR
Nils Karl-Erik Ståke
BY
ATTORNEY

AIR INTAKE FOR TURBOJET AIRCRAFT ENGINE

This invention relates to air intakes for turbojet aircraft engines, and is more particularly concerned with means for maintaining a substantially uniform velocity and pressure distribution circumferentially around the compressor air inlet of a turbojet aircraft engine when the aircraft is moving at a relatively large oblique angle to its longitudinal axis.

To enable a turbojet engine to operate efficiently, it is necessary that the air entering its compressor inlet have substantially uniform velocity, pressure and direction of flow around the entire circumference of the inlet. It is of special importance that all of the blades of the first stage of the compressor encounter air that is moving at the same velocity of flow.

Heretofore when air has been conducted to the inlet of a turbojet aircraft engine through an elongated forwardly opening duct, the desired uniform pressure, velocity and flow direction has not been obtained across the entire compressor inlet at times when the direction of motion of the aircraft was oblique to its longitudinal axis, that is, during subsonic flight at high angles of attack or in a slip or skid. Since the air intake duct has wall portions that define opposite interior surfaces which extend parallel to the longitudinal axis of the aircraft, one of these surfaces becomes a lee surface and the other a weather surface when the aircraft moves obliquely to its longitudinal axis, and the air stream moving into the duct has to curve through an angle corresponding to the angle between the longitudinal axis of the aircraft and its direction of flight. As a result, there are differences in velocity and in pressure in the air at different points across the cross section of the curving stream flow.

Specifically, at high angles of attack the lee surface is at the lower portion of the duct, where an accumulation of boundary layer air has heretofore developed as the result of the nonuniform pressure difference across the curving airstream and the consequent induction of velocity components in the stream that were transverse to the longitudinal axis of the duct.

Owing to this accumulation of boundary layer air, the downstream air at the compressor inlet had one zone in which its velocity and stagnation pressure were substantially lower than the average velocity and pressure of the air moving to the compressor inlet, and another zone, circumferentially spaced from the first, in which the velocity and stagnation pressure of the air were higher than said average. Hence the compressor blades as they rotated, passed through these zones successively, alternately encountering air moving at high relative velocity and at low relative velocity. This circumferentially nonuniform distribution encouraged stalling of the blades (compressor stall) and caused a cyclic pressure variation in the compressor (so-called pumping), bringing about poor functioning and capacity of the engine and possible flameout.

The general object of the present invention is to overcome these conditions, and more particularly to prevent the secondary flow transversely to the duct axis that initiates the disturbances.

It is also an object of the invention to provide means in an air intake duct for a turbojet engine, operative when the aircraft moves obliquely to its longitudinal axis, for improving the velocity and stagnation pressure distribution in the forward part of the duct, thereby assuring that downstream air at the engine compressor inlet will have a uniform velocity and flow direction all around the circumference of the inlet.

More specifically, it is an object of this invention to provide means for introducing a stream of air into the interior of an air intake duct for a turbojet aircraft engine when the aircraft is moving obliquely to its longitudinal axis, which stream overcomes, or substantially overcomes, any component of flow transverse to the duct axis that would otherwise tend to develop in the duct and thereby prevents the development of troublesome nonuniform axial air velocities around the compressor inlet.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which.

Figure 7:
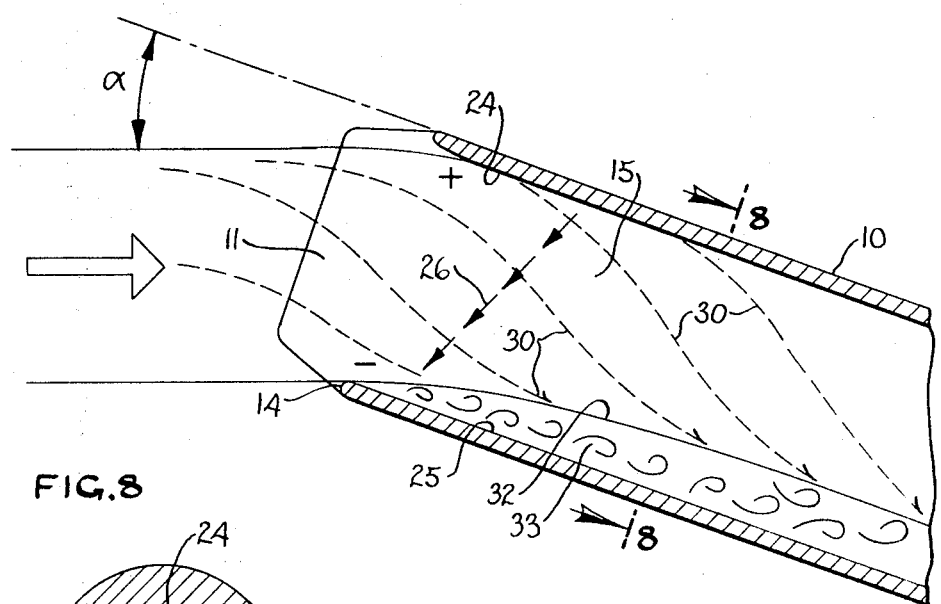
FIG. 7 is a longitudinal sectional view through the forward portion of a prior art air intake duct for a turbojet aircraft engine, with a diagrammatic indication of flow conditions in the same when the aircraft is flown at a high angle of attack.
Figure 8:
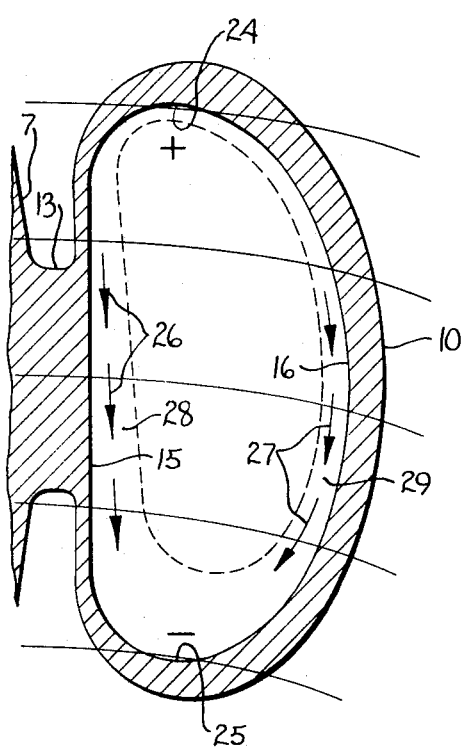
FIG. 8 is a cross section view on an enlarged scale taken on the plane of the line 8-8 in FIG. 7.
Figure 9:
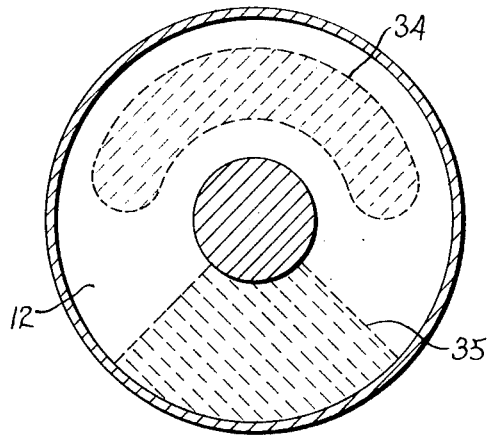
Figure 10:
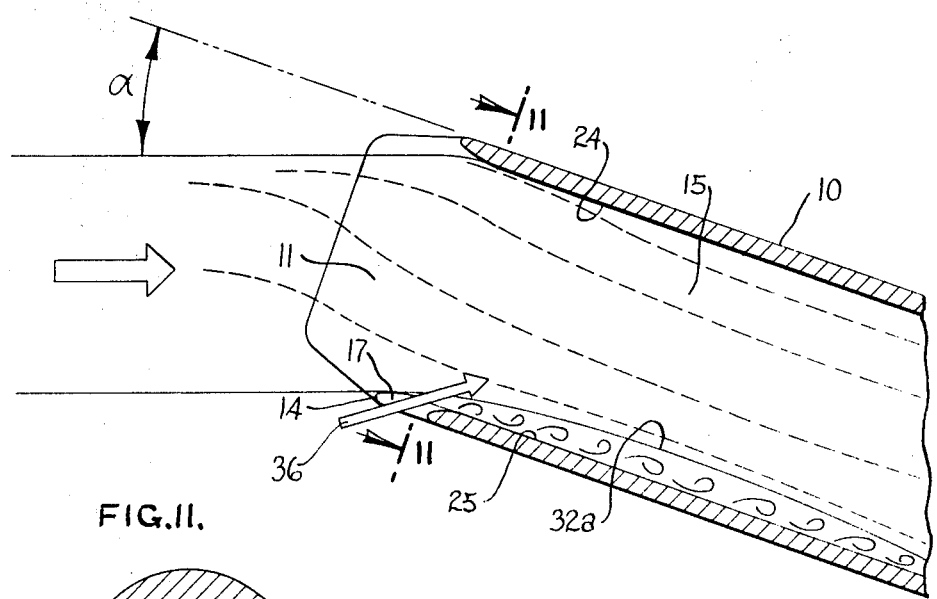
Figure 11:
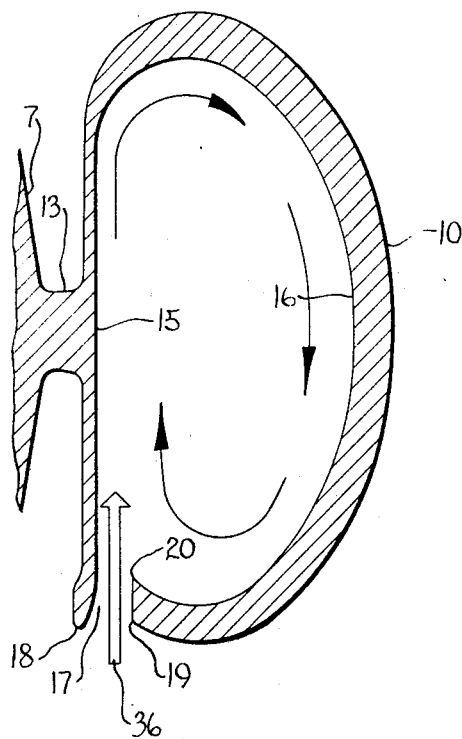
Figure 12:
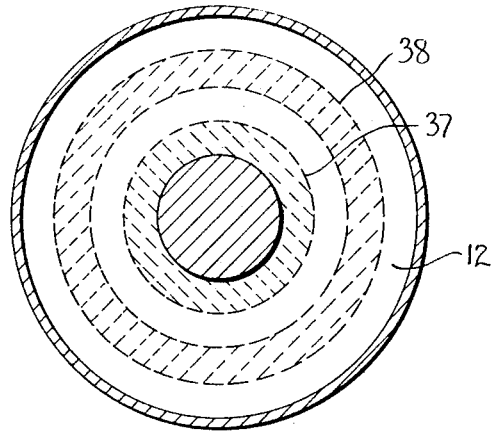

FIG. 9 is a cross section view through the air duct of FIGS. 7 and 8, but taken at a zone in said duct directly in front of the compressor inlet of the engine and illustrating the velocity and stagnation pressure distribution in that zone; and FIGS. 10, 11 and 12 respectively correspond to FIGS. 7, 8 and 9 but illustrate a duct embodying the principles of this invention and the conditions therein, for comparison with FIGS. 7, 8 and 9.

Referring now to the accompanying drawings the numeral 5 designates generally an aircraft having wings 6, a fuselage 7, and a turbojet engine 8 housed in the rear portion of the fuselage to power the aircraft. Combustion air is brought to the engine through a forwardly branched delivery passage 9 comprised of a pair of intake duct portions 10, one at each side of the fuselage 7, each having a forwardly opening intake or mouth 11.

Some distance rearwardly of their mouths but at a distance ahead of the air inlet to the engine 8 the ducts 10 merge to form a single passage portion 12 that extends rearwardly to the engine; but flow conditions in the rear of this passage, that is, at the engine inlet, are very much dependent upon flow conditions in the forward portions of the ducts 10, and therefore these are of primary interest.

At the mouth 11 of each duct, the wall that defines the duct is spaced outwardly from the adjacent side surface of the fuselage, and a conventional boundary layer deflecting device 13 prevents the main part of the boundary layer that forms on the fuselage, ahead of the mouth of the duct, from being carried into the duct. As is also conventional the wall of each duct has a more or less bluntly rounded front edge, as at 14, to assure relatively smooth entry of the airstream into the duct.

The walls of the forward portion of the duct define internal surfaces which extend parallel to the longitudinal axis of the aircraft and have a more or less elliptical cross section, with the major axis of the ellipse oriented substantially vertically. Thus the duct has opposite interior side surfaces 15 and 16 that have substantial height, the one nearer the fuselage of the aircraft being designated 15.

According to the invention, each intake duct is provided with a slot 17 which extends through its wall near the mouth 11 of the duct and which is somewhat elongated lengthwise of the duct so as to be generally jet shaped. The slot is located at the bottom of the duct, closely adjacent to its laterally inner interior surface 15, so that when the aircraft flies at high angles of attack, the slot induces a flow of air into the duct from the airstream that would otherwise pass beneath it.

Figure 4:
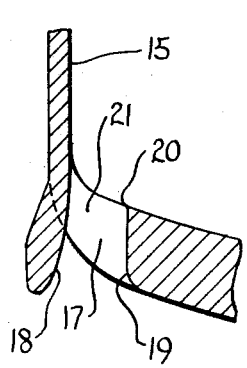
FIG. 4 is a fragmentary transverse sectional view taken on the plane of the line 4-4 in FIG. 3.

As best seen in FIGS. 4 and 11, the shape of the slot is such that it tends to direct the air flowing through it upwardly along the interior surface 15, and to this end one side surface of the slot may be extended by means of a downwardly projecting lip 18 that comprises, in effect, an extension of the wall portion that defines the interior duct surface 15. In width the slot converges radially inwardly, in that the lip 18 is rounded at its extremity and the opposite side surface of the slot is also rounded at the exterior of the duct, as at 19, both curvatures being convex. However the side surface of the slot that is opposite the lip joins the interior duct surface at a relatively sharp corner 20 that cooperates with the lip in directing the airstream through the duct upwardly along the interior wall surface 15. At its rear the slot is defined by a surface 21 that extends generally obliquely rearwardly and radially inwardly relative to the duct, being convexly curved and merging smoothly with the interior surface portion of the duct that is directly behind the slot. The curvature of the surface 21 is best seen in FIG. 3.

It will be evident that the curvatures of the surfaces which define or bound the slot 17 are such as to impart an acceleration to the airstream flowing through it into the duct, and to assure that such airstream will be relatively smooth.

Figure 2:
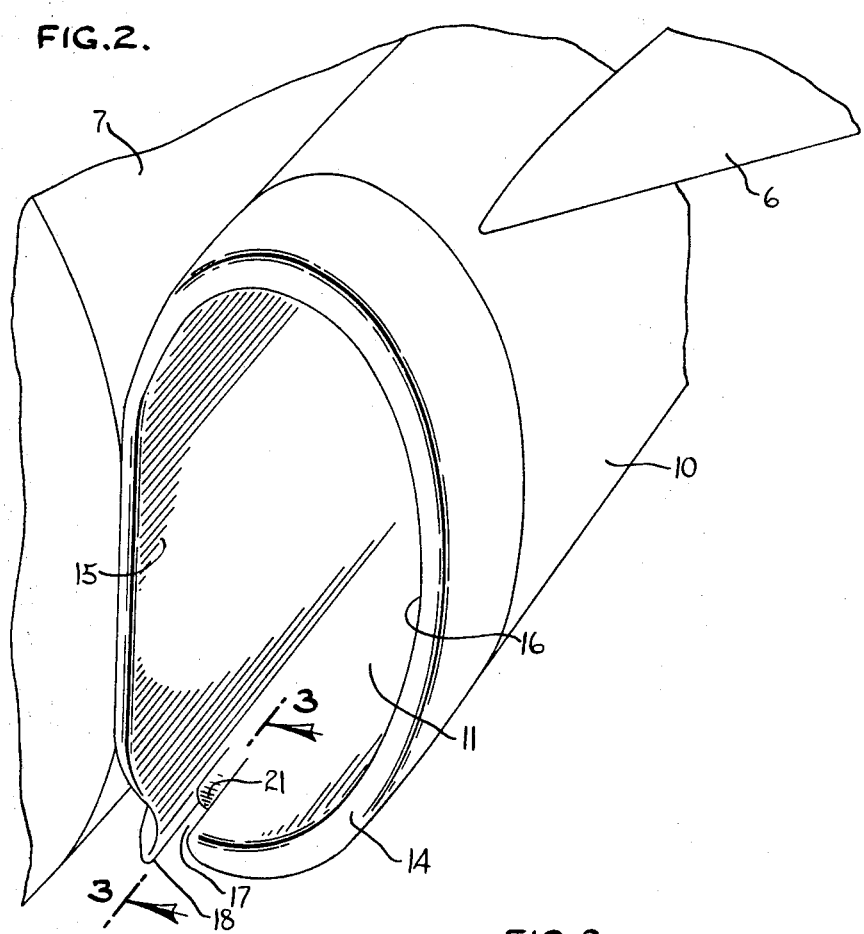
FIG. 2 is a perspective view on an enlarged scale of the forward end of an air intake duct of the aircraft illustrated in FIG. 1.
Figure 3:
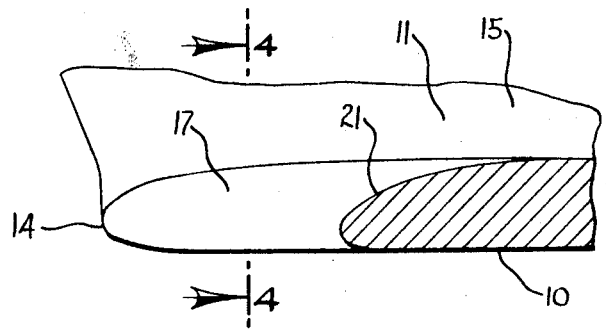
FIG. 3 is a fragmentary longitudinal sectional view on a further enlarged scale taken on the plane of the line 3-3 in FIG. 2.
Figure 5:
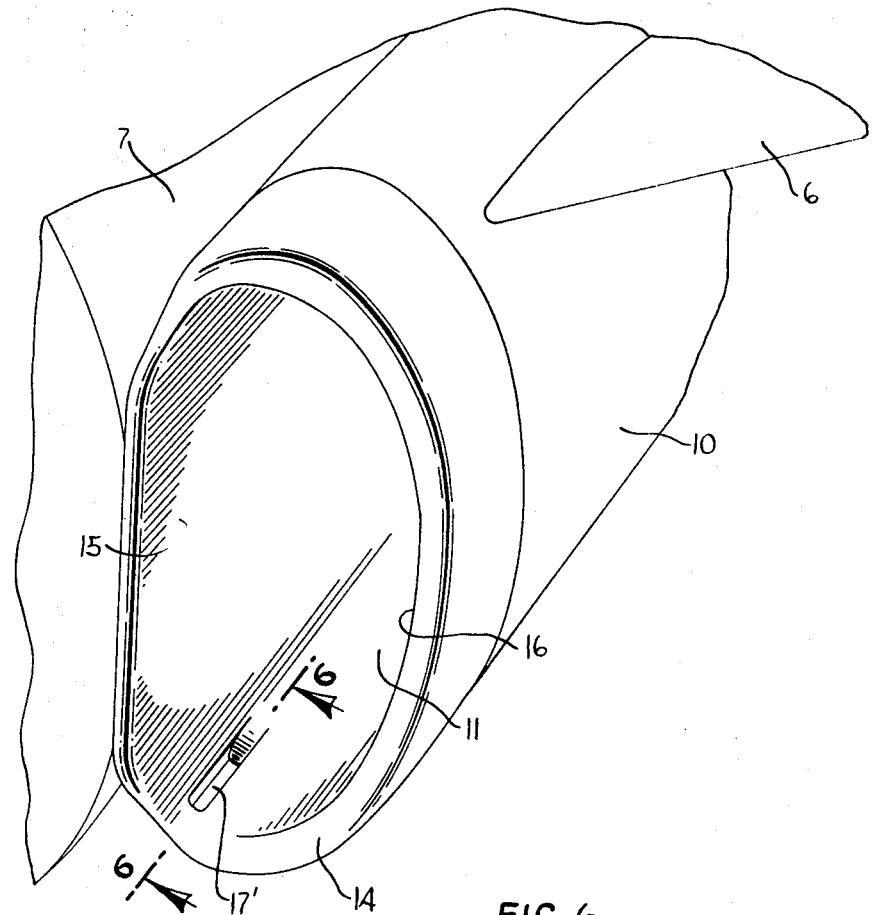
FIGS. 5 and 6 are views generally corresponding to FIGS. 2 and 3, respectively, but illustrating a modified embodiment of the invention.
Figure 6:
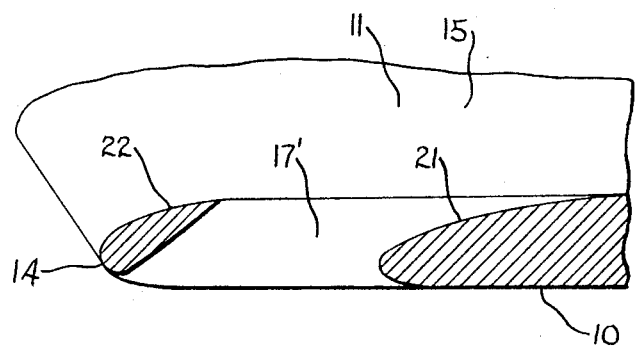

In the embodiment of the invention illustrated in FIGS. 2, 3 and 4, the slot 17 opens through the leading edge of the duct, to the mouth 11 thereof. The embodiment of the invention illustrated in FIGS. 5 and 6 differs only in that the slot 17' opens through a portion of the duct wall that is spaced a short distance behind the mouth of the duct, so that the front end portion of the duct wall is continuous all around the mouth. The embodiment of FIGS. 5 and 6 is advantageous from the structural standpoint in that the leading edge portion of the duct that is directly ahead of the slot 17' serves to transmit loads between the opposite wall portions that define the surfaces 15 and 16. As best seen in FIG. 6, the portion 22 of the duct wall that is just ahead of the slot has an aerodynamically flow-shaped profile somewhat resembling that of an airfoil slat.

Figure 1:
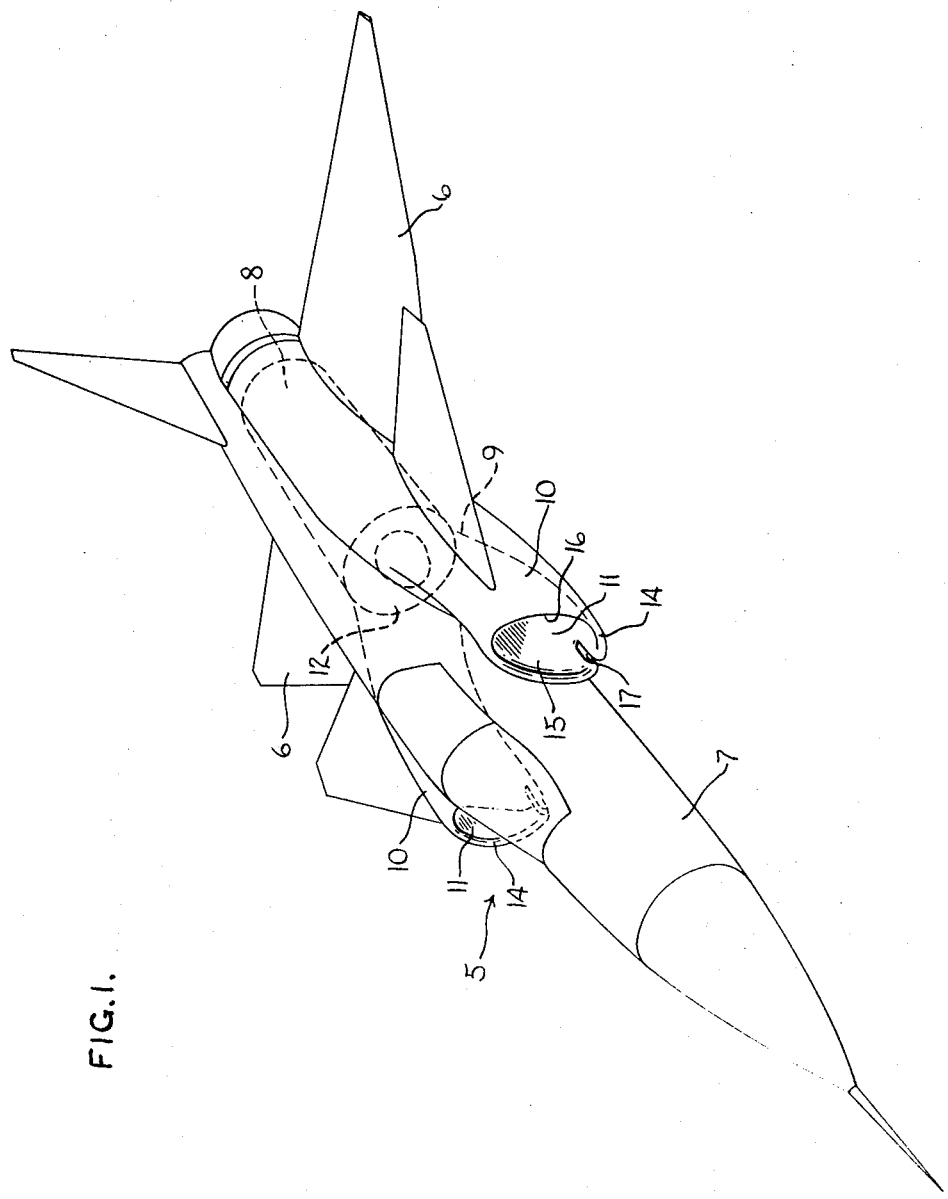
FIG. 1 is a perspective view of an aircraft powered by a turbojet engine and provided with engine air intake means embodying the principles of this invention.

The operation of the slot of this invention is best understood by comparison with what takes place in a conventional unslotted air intake duct when the aircraft flies at a high angle of attack, as illustrated in FIGS. 7, 8 and 9, wherein FIG. 7 shows the front portion of a conventional unslotted duct which is otherwise comparable to that shown in FIG. 1.

With the aircraft flying at an angle of attack corresponding to α, the imaginary tubular stream of air that is to enter the mouth of the duct comes from obliquely ahead of it and relatively below it, and must therefore bend through the angle α as it enters the duct. The upper interior surface 24 of the duct becomes a weather surface with respect to the entering airstream, and the lower interior surface 25 becomes a lee surface. Under the circumstances there is a pressure difference across the field of flow. Near the upper or weather surface 24 the pressure is higher than the average in the field of flow, as designated by +, while near the lee surface 25 it is lower than the average, as designated by −. This pressure difference gives rise to a secondary flow, transverse to the duct axis, designated by arrows 26 and 27, in the boundary layers 28 and 29 along the opposite side surfaces 15 and 16. Owing to this transverse flow component, the general flow of air near the laterally inner surface 15 is obliquely rearwardly and downwardly, as indicated by the arrows 30 in FIG. 7. A similar flow condition exists along the opposite interior surface 16. Because the interior bottom surface of the duct is a lee surface, and the air flowing along it has a substantially low axial velocity and stagnation pressure, and because of the secondary flow toward it, there accumulates along that surface a thick boundary layer 32 in which there is a rearwardly moving turbulent separated flow designated by 33.

In consequence of the conditions just described, the distribution of velocity and stagnation pressure at the engine compressor inlet will not be uniform all around the circumference of the inlet, but will instead be substantially as illustrated in FIG. 9, with a more or less bean-shaped or saddle-shaped zone 34 of air having a higher stagnation pressure and velocity than the average of the air flowing into the inlet, which zone extends arcuately over and to the sides of the central engine body; and with a sector-shaped zone 35 beneath the central engine body in which stagnation pressure and velocity are lower than said average. As explained above, passage of the compressor turbine blades successively through these zones of different stagnation pressure and velocity in the course of each orbit results in disturbances to the thrust produced by the engine.

In a duct provided with the slot 17 of this invention, with the aircraft flying at a high angle of attack, the air flowing through the slot is moving in a direction to counteract the transverse secondary flow in the boundary layer on the interior wall surface 15, as illustrated in Figure 10. The slot is so dimensioned that the air flowing through it, which is designated by the arrow 36, has an impulse force substantially equal to (and preferably somewhat larger than) the secondary flow of boundary layer air that would develop in the absence of the slot, so that such transverse secondary flow is overcome or counteracted. With elimination of this transverse boundary layer flow, the boundary layer 32a of turbulent separating flow along the bottom interior duct surface will be substantially thinner and smaller in cross section than it would be in the absence of the slot, and consequently there will be little or not variation of pressure circumferentially around the engine inlet.

By so proportioning the slot 17 that the air flowing through it has a larger impulse force than that of the secondary flow which would prevail in the boundary layer of an unslotted duct, as is preferred, a secondary flow in the boundary layer is caused to take place in the direction opposite to what it would have in the absence of the slot, that is, upwardly along the wall surface 15; and consequently a torsional flow is produced in the duct. This torsional flow rotates the airflow through the air duct through an angle which depends upon the dimensioning of the slot, and which can be such that there can be obtained at the engine inlet a pressure distribution like that illustrated in FIG. 12, with an annular radially innermost zone 37 having a lower pressure and velocity than the average values of the flow, and a radially outer zone 38 of air having a higher velocity and pressure than the average, the latter zone being radially intermediate the wall of the air inlet passage and the radially inner zone 37.

A pressure and velocity distribution of this type, which varies across the radius of the compressor blade orbit but is substantially uniform circumferentially, does not produce objectionable disturbances to engine operation.

It will be evident that a slot embodying the principles of this invention can be located elsewhere around the mouth portion of the intake duct than in the particular location above described, depending upon circumstances. It will also be apparent that means could be provided for closing the slot at times when the flight path of the aircraft was substantially parallel to its longitudinal axis and for opening the slot only at times when the aircraft moved obliquely to its said axis.

From the foregoing description taken with the accompanying drawings it will be apparent that this invention provides very simple but effective means in an air intake for a turbojet aircraft engine for preventing disturbances to the operation of the engine at times when the aircraft moves in a direction of flight that is oblique to its longitudinal axis.

What I claim as my invention is:

1. An air intake for a turbojet aircraft engine, comprising a duct extending lengthwise rearwardly to the engine inlet from a forwardly opening mouth, said duct having wall portions defining opposite interior surfaces that extend substantially parallel to the longitudinal axis of the aircraft so that when said axis of the aircraft is inclined to the direction of motion of the aircraft, one of said surfaces is a lee surface and the other a weather surface with respect to the stream of air entering said duct, said duct being characterized by:

a slot through the wall portion that defines said one surface, said slot being
1. near the mouth of the duct,
2. elongated lengthwise of the duct,
3. defined at its rear by a surface portion which extends generally obliquely rearwardly and radially inwardly relative to the duct and is convexly curved to merge with said one surface, and
4. oriented to direct air along an interior surface of the duct that extends between said weather and said lee surfaces, in a direction obliquely rearwardly and generally from said lee surface to said weather surface, so that the slot counteracts the tendency for a transverse secondary flow to develop in the boundary layer of said surface between the weather and lee surfaces and overcomes the tendency for the boundary layer along said lee surface to have a lower velocity and stagnation pressure than that along the weather surface, thus insuring that the stream of air entering the engine inlet will have a substantially uniform distribution of velocities and stagnation pressure circumferentially around the inlet.

2. An air intake for a turbojet aircraft engine, comprising a duct extending lengthwise rearwardly to the engine inlet from a forwardly opening mouth, said duct having wall portions defining transversely curved interior surfaces which extend lengthwise substantially parallel to the longitudinal axis of the aircraft and which comprise top and bottom interior surface portions and opposite side interior surface portions, said duct being characterized by:

A. the curvature of one of said side interior surface portions being on a substantially larger radius than that of the top and bottom interior surface portions;

B. said interior surface portions also comprising a small radius portion connecting said side interior surface portion and the bottom interior surface portion; and
C. a slot through the wall portion that defines said small radius portion, said slot being
1. near the mouth of the duct,
2. elongated lengthwise of the duct, and
3. defined by surfaces oriented to direct air into the interior of the duct obliquely upwardly and rearwardly along said side interior surface portion.

3. An air intake for a turbojet aircraft engine comprising a duct extending lengthwise rearwardly to the engine inlet from a forwardly opening mouth, said duct having a wall that defines interior surfaces which extend substantially parallel to the longitudinal axis of the aircraft and which comprise transversely arcuate top and bottom surfaces and a substantially flat side surface, said duct being characterized by:

a slot through the duct wall,
1. near the mouth of the duct,
2. elongated lengthwise of the duct,
3. said slot being adjacent to the bottom of said interior side surface to have one of its longitudinal surfaces comprise substantially a downward continuation of said interior side surface of the duct, and
4. said slot having its other longitudinal surface joining the bottom interior surface of the duct at a substantially sharp angle so that the longitudinal side surfaces of the slot cooperate to direct air obliquely upwardly and rearwardly along said interior side surface of the duct.

4. The air intake of claim 3, further characterized by:
a downwardly projecting lip on the duct wall defining a convex downwardly divergent extension of the first mentioned longitudinal surface of the slot.